Jan. 18, 1966     K. J. CLEEREMAN ETAL     3,230,127
PROCESS FOR FORMING PLASTIC COATED ARTICLES
Filed March 5, 1962
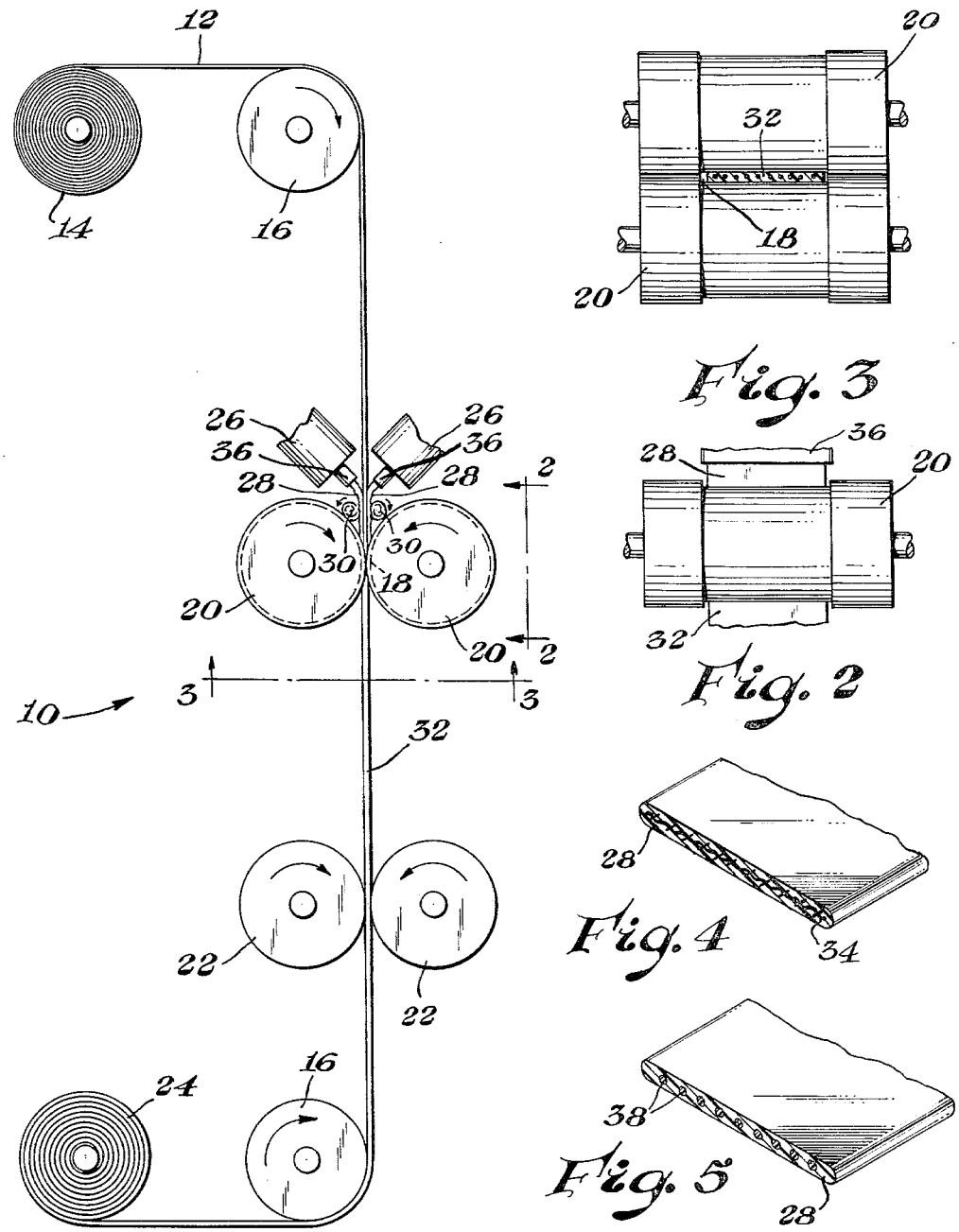
INVENTORS.
Kenneth J. Cleereman
Donald J. Dirkse
BY Lloyd E. Hesseman Jr.
ATTORNEY

United States Patent Office 3,230,127
Patented Jan. 18, 1966

3,230,127
PROCESS FOR FORMING PLASTIC
COATED ARTICLES
Kenneth J. Cleereman and Donald J. Dirkse, Midland, Mich., assignors to The Dow Chemical Company, Midland, Mich., a corporation of Delaware
Filed Mar. 5, 1962, Ser. No. 177,674
2 Claims. (Cl. 156—244)

This invention relates generally to a process for film encapsulation of articles and, more specifically, it relates to a novel continuous process of encapsulating running webs and strips of permeative or otherwise porous filler materials or substrates with normally solid film-forming thermoplastic resins on opposite sides thereof simultaneously.

It is well known that plastic films can be utilized as protective encapsulating materials for individual strands, filaments, cores, and webs of permeative materials such as fabric and the like. Such materials include polymerized vinyl chloride and vinyl acetate, rubber hydrochloride, polyethylene, ethyl cellulose, etc. For example, the characteristics of polyethylene are such that it remains flexible at low temperatures, it has a low moisture permeability, it is tough, extensible and abrasive resistant. Furthermore, polyethylene is odorless, tasteless, and nontoxic. It can be thermally formed or shaped and has a low specific gravity so that a polyethylene film of given thickness will cover a relatively large area per pound. Thus, relatively thin films can be achieved. It is further noted that often the combination of permeative filler materials, such as fibrous strands, sealed between such films as polyethylene can provide, in effect, a product having advantages and properties beyond those taught by the filler material or plastic itself. For example, a burlap filler material completely embedded in a polyethylene strip will serve to reinforce the strip, and the strip will act not only as a protective coating to the burlap, but will inure it to the benefits of resiliency and original memory.

The inability to secure an effective bond between such films as polyethylene and a filler material, especially in a continuous fashion, has been a problem. One purported process for accomplishing an effective bond is described in United States Patent 2,714,571, issued to C. E. Irion et al. on August 2, 1955. However, this process provides for the coating of the fibrous material on one side only and the bonding is made somewhat secure only by maintaining the polyethylene at a low temperature through a contacting roller. But even the latter process only suggests lamination of films with a certain limited number of filler materials. It does not purport to provide a process for lamination between film and practically any permeative or otherwise porous material. For example, an effective bond is practically impossible between most metals or fiberglass and plastic film. Furthermore, encapsulation of such materials, even when permeative or porous, has been impractical prior to the present invention.

Likewise, prior attempts to encapsulate a permeative filler material have generally proved either ineffective or inefficient. One such inefficient process involves taking of two pieces of film and inserting the filler material therebetween and placing the combination between upper and lower heated platens of a press. Of course, such as process is not continuous and high production is not easily attainable.

One of the main difficulties, prior to the present invention, of encapsulating filler materials by a continuous process using pinch rollers was that caused by the build-up of a mill bank of plastic on each side of the filler material adjacent the entrance side of the nip of the rollers. These mill banks would revolve in a direction opposite from that of the pinch rollers and, in effect, take the plastic off the filler material before the latter is sealed therewith. A process which attempted to solve this problem is that disclosed in co-pending application Serial No. 113,691, filed May 31, 1961, by D. S. Chisholm, which relates to the simultaneous coating on both sides of certain strand-like materials. But the latter process is extremely elaborate and is more like coating of a viscous liquid to a filler material rather than an encapsulation of the material between film layers. Only limited items can be processed by this latter method due to tearing stresses caused by the reverse direction of the pinch rollers used.

Many attempts to eliminate mill banks have been tried and they can be substantially reduced as to size and importance if perfect (uniform) or near-perfect control of the feed is maintained. However, such control is not always obtainable, and even then the reduced mill banks still presented a problem, until the present invention.

Accordingly, it is an object of the present invention to provide a novel and efficient process for encapsulating a running filler material with plastic film.

Another object of the present invention is to provide for an effective process for encapsulation of filler materials in plastic film or sheets.

It is still another object of the present invention to provide for a novel process for encapsulating a permeative or otherwise porous filler material without the disadvantages above described with respect to prior processes.

Still another object of the present invention is to provide a novel process wherein an almost unlimited number of different permeative or otherwise porous materials can be encapsulated in film plastic in a continuous manner.

Briefly then, the present invention relates to a process wherein there is an encapsulation of permeative or otherwise porous filler material between layers of thermoplastic film, such as polyethylene. The process described is a continuous one wherein thermoplastic sheets or films are brought into contact with the filler material just prior to entering the nip of heated pinch or pressure rollers. These pressure rollers are rotating in a direction generally the same as the entering filler material and thermoplastic films, and form the encapsulation. By having the thermoplastic film, while still in a heated condition, come in contact with the filler material prior to entering the nip of the pressure rollers, any mill banks which have formed adjacent the nip are penetrated by the sheets and are prevented from any substantial rotation, reverse from that of the rollers, thus preventing these mill banks from carrying the thermoplastic films away from the material prior to encapsulation. Permeative or otherwise porous filler materials of almost any nature can thus be encapsulated as the films on opposite sides of the materials penetrate therethrough and heat seal together. Although some bonding between the films and filler material might also occur, the mainstay of the encapsulation is the sealing of the opposite layers of film together.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, in which:

FIGURE 1 is a schematic cross-sectional view of apparatus which can be used in the practice of the principles of the present invention;

FIGURE 2 is a view of FIGURE 1 taken along the reference line 2—2 thereof;

FIGURE 3 is a view of the apparatus of FIGURE 1 taken along the reference line 3—3 thereof;

FIGURE 4 illustrates a partial isometric view of one encapsulated tape formed by the apparatus of FIGURE 1; and FIGURE 5 illustrates a partial isometric view of another encapsulated tape formed by the apparatus of FIGURE 1.

Referring more particularly to FIGURE 1, there is illustrated schematically one embodiment of an apparatus 10 for carrying out the novel process of the present invention. A strip or web 12 of a filler substrate material taken from a feed roll 14 is passed over guide roller 16 for alignment with nip 18 of pinch or pressure rollers 20, the latter preferably being heated. Take-away rollers 22 serve to pull the strip through the pressure rollers 20 where it can be subsequently stored after encapsulation on rewind reel 24. The nip 18, as more readily seen in FIGURE 3, provides a gap which controls the thickness of the final tape. This gap can be made adjustable, if desired, by ways not indicated here but well-known to those skilled in the art.

Extruders 26 are arranged on each side of the incoming strip 12 intermediate guide roller 16 and pressure rollers 20, and are adapted to extrude, directly onto the strip 12 sheets or films of thermoplastic material, such as polyethylene. When sheets 28 emitted by the extruders 26 first contact the strip 12 there is a tendency for some of the thermoplastic material to collect in a mill bank 30 adjacent the entrance side of nip 18. Extruders 26 are arranged so that they emit flat plastic sheets 28 such that they come in contact with the strip 12 either just before it reaches mill bank 30, or just after the particular portion of the strip to be engaged enters the mill bank. It is generally more desirable if the former is the case. However in any case, the flat plastic sheets 28 should engage their respective portions of strip 12 prior to entering of nip 18 of pressure rollers 20.

As flat sheets 28, engaging the strip 12, enter pressure rollers 20, the latter in effect provides a heat sealed encapsulation of the web between the opposite thermoplastic sheets. To prevent mill bank 30 from rolling, generally in a reverse direction from the direction of travel of the strip 12 and pressure rollers 20, it has been found that when sheets 28 penetrate that mill bank the sheets substantially prevent mill bank roll and thus, in effect, reduce to negligible amounts the quantity of thermoplastic material being removed from the strip by mill bank 30 prior to encapsulation. Tape, strip, or web 32, which comprises original strip 12 encapsulated by sheets 28, thus passes from the pressure rollers 20, through the take-away rollers 22 and onto the rewind reel 24. Tape 32 generally is formed such that the thermoplastic sheets are at least partially pressed through and around portions of the filler material of strip 12 and heat sealed together.

One particular embodiment of tape 32 is illustrated in FIGURE 4 wherein a woven cotton fabric 34 is encapsulated between layers of thermoplastic film 28. The fabric 34 can, for purposes of illustration, weigh approximately .18 pound per yard and have from 40 to 44 threads per inch which still is coarse enough to permit the thermosplastic film to pass therethrough as well as therearound. Film 28 in this instance can be a polyethylene film having a molecular weight of about 19,000 and can be supplied through an orifice 36 of the extruders 26 at a temperature of about 500° F. The web of the fabric 34 is kept at about room temperature when the extruded polyethylene sheets come in contact therewith, the pressure rollers 20 being at a temperature of about 180° F. when forming the encapsluation. This roller proximately .18 pound per yard and have from 40 to 44 180° F. when forming the encapsulation. This roller temperature should be low enough to prevent the sheets from adhering to the rollers. Also, this roller temperature should be low enough so that when combined with that of the film, the filler material is not melted or otherwise destroyed. The web speed can be approximately 80 feet per minute and the gap at the nip 18 can be that necessary to provide an encapsulated strip of the desired thickness, in this instance being only a few mils thicker than the fabric itself. Following heat sealing, tape 32 cools to room temperature and is wound upon rewind reel 24.

In another embodiment parallel strands of a rayon cord 38 can be encapsulated or locked in thermoplastic film in a similar manner. The strands can be of the type used for tire cords and should be placed side by side in a non-touching relationship. The process for forming the laminate of FIGURE 5 is substantially that as described above for FIGURE 4 with the exception that the gap of nip 18 is taken as that necessary to provide an encapsulated strip of desired thickness for this particular filler material.

Accordingly, it is understood that an almost infinite number of different products can be made from the process of the present invention wherein such items as burlap, fine wire mesh, cotton or synthetic fibers, perforated metallic sheets, or any other substance adapated to be formed into a belt-like configuration can be continuously encapsulated with thermoplastic film. While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A process for encapsulating a continuously moving strip of material between converging hot extruded thermoplastic resinous films under conditions wherein mill banks of some of the hot plastic are formed adjacent the nip of a pair of pinch rollers, said process comprising the steps of extruding said film onto opposite sides of said strip material before the engaged portions of the latter reach said mill banks and the nip of said rollers, passing said strip material with the films engaged on opposite sides thereof into said mill banks, pressing said films about said strip material against said pinch rollers, the direction of travel of said rollers at the point at which said strip material passes therebetween being essentially the same direction of travel as that of said strip material, wherein said films are heat sealed together locking said strip therebetween.

2. A process for encapsulating a continuously moving strip of permeative material between converging hot extruded thermoplastic resinous films under conditions wherein mill banks of some of the hot plastic are formed adjacent the nip of a pair of pinch rollers, said process comprising the steps of extruding said films onto opposite sides of said permeative strip material before the engaged portions of the latter reach said mill banks and the nip of said rollers, passing said permeative strip material with the films engaged on opposite sides thereof into said mill banks, pressing said films through and around said permeative strip material against said pinch rollers, the direction of travel of said rollers at the point at which said permeative strip material passes therebetween being essentially the same direction of travel as that of said permeative strip material, wherein said films are heat sealed together locking said permeative strip material therebetween.

References Cited by the Examiner

UNITED STATES PATENTS 2,091,124  8/1937  Stewart _____ 156—244

FOREIGN PATENTS 220,509  2/1959  Australia.
681,872  10/1952  Great Britain.

EARL M. BERGERT, *Primary Examiner.*